United States Patent
Juan et al.

(10) Patent No.: US 11,072,027 B2
(45) Date of Patent: Jul. 27, 2021

(54) REMOVABLE 3D BUILD MODULE COMPRISING A MEMORY

(71) Applicant: Hewlett-Packard Development Company, L.P., Houston, TX (US)

(72) Inventors: Fernando Juan, Sant Cugat del Valles (ES); Pau Martin Vidal, Sant Cugat del Valles (ES); Esteve Comas, Sant Cugat del Valles (ES); Jordi Gimenez Manent, Sant Cugat del Valles (ES); Pol Morral, Sant Cugat del Valles (ES); Pablo Dominguez Pastor, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 336 days.

(21) Appl. No.: 15/542,052

(22) PCT Filed: Jan. 20, 2015

(86) PCT No.: PCT/EP2015/051014
§ 371 (c)(1),
(2) Date: Jul. 6, 2017

(87) PCT Pub. No.: WO2016/116139
PCT Pub. Date: Jul. 28, 2016

(65) Prior Publication Data
US 2018/0001567 A1    Jan. 4, 2018

(51) Int. Cl.
*B22F 12/00*    (2021.01)
*B29C 64/259*    (2017.01)
(Continued)

(52) U.S. Cl.
CPC .............. *B22F 12/38* (2021.01); *B22F 12/00* (2021.01); *B23K 26/342* (2015.10);
(Continued)

(58) Field of Classification Search
CPC ... B29C 64/153; B29C 64/255; B29C 64/259; B29C 64/295; B29C 64/314; B33Y 30/00
See application file for complete search history.

(56) References Cited

U.S. PATENT DOCUMENTS 5,846,370 A * 12/1998 O'Connor .............. B33Y 10/00
156/272.8
6,305,769 B1    10/2001 Thayer
(Continued)

FOREIGN PATENT DOCUMENTS

JP    2006312310 A    11/2006
WO    WO-2014165735    10/2014

OTHER PUBLICATIONS

"How to 3D Print—Beginner's Guide to 3D Printing", download date Jul. 12, 2017, pp. 54. http://3dprinterplans.info/how-to-3d-print-beginners-guide-to-3d-printing/.
(Continued)

*Primary Examiner* — Joseph S Del Sole
*Assistant Examiner* — Manley L Cummins, IV
(74) *Attorney, Agent, or Firm* — HP Inc. Patent Department

(57) ABSTRACT

A removable build module to connect to a host apparatus, may include a build platform to support an object-to-be-built, a drive unit to move the build platform, a memory to receive and store build parameters, and an interface circuit to communicate the build parameters to the host apparatus.

20 Claims, 14 Drawing Sheets

(51) Int. Cl.
   *B33Y 30/00*   (2015.01)
   *B33Y 50/02*   (2015.01)
   *B23K 26/342*  (2014.01)
   *B29C 64/255*  (2017.01)
   *B29C 64/295*  (2017.01)
   *B29C 64/393*  (2017.01)
   *B22F 10/10*   (2021.01)
   *B29C 64/153*  (2017.01)

(52) U.S. Cl.
   CPC .......... *B29C 64/255* (2017.08); *B29C 64/259* (2017.08); *B29C 64/295* (2017.08); *B29C 64/393* (2017.08); *B33Y 30/00* (2014.12); *B33Y 50/02* (2014.12); *B22F 10/10* (2021.01); *B29C 64/153* (2017.08); *Y02P 10/25* (2015.11)

(56) References Cited

U.S. PATENT DOCUMENTS

| | | | | |
|---|---|---|---|---|
| 6,554,600 | B1* | 4/2003 | Hofmann | B29C 41/34 425/174.4 |
| 7,520,740 | B2* | 4/2009 | Wahlstrom | B33Y 40/00 425/186 |
| 8,282,380 | B2 | 10/2012 | Pax et al. | |
| 8,888,480 | B2 | 11/2014 | Yoo | |
| 2004/0045941 | A1* | 3/2004 | Herzog | B23K 26/02 219/121.6 |
| 2006/0219671 | A1* | 10/2006 | Merot | B29B 13/021 219/121.6 |
| 2007/0063372 | A1* | 3/2007 | Nielsen | B29C 64/165 264/113 |
| 2008/0006958 | A1 | 1/2008 | Davidson | |
| 2013/0328228 | A1* | 12/2013 | Pettis | F16M 11/12 264/40.1 |
| 2014/0117585 | A1 | 5/2014 | Douglas et al. | |
| 2014/0265034 | A1 | 9/2014 | Dudley et al. | |
| 2014/0265049 | A1 | 9/2014 | Burris et al. | |
| 2016/0039149 | A1* | 2/2016 | Cassara | B29C 64/386 425/150 |

OTHER PUBLICATIONS

International Search Report and Written Opinion dated Oct. 7, 2015, PCT Patent Application No. PCT/EP2015/051014, filed Jan. 20, 2015, European Patent Office.

* cited by examiner

REMOVABLE 3D BUILD MODULE COMPRISING A MEMORY

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3d object is formed from the build material. Such techniques may range from applying ultra-violet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where it needs to be transferred to the building area or building compartment of the additive manufacturing apparatus where the actual manufacturing takes place.

DRAWINGS

DESCRIPTION

Three-dimensional objects can be generated using additive manufacturing techniques. Each layer may be generated by solidifying portions of one or more successive layers of build material. The build material can be powder-based and the properties of generated objects may be dependent on the type of build material and the type of solidification. In some examples, solidification of a powder material is enabled using a liquid binder agent. In further examples, solidification may be enabled by temporary application of energy to the build material. In certain examples, coalescing agents are applied to build material, wherein a coalescing agent is a material that, when a suitable amount of energy is applied to a combination of build material and coalescing agent, may cause the build material to coalesce and solidify. In other examples, other build materials and other methods of solidification may be used. In certain examples, the build material includes paste material, slurry material or liquid material.

An example additive manufacturing process is known as 3D printing. In this disclosure additive manufacturing or 3D printing is also referred to as "building". A build job is a single job as received an processed by an additive manufacturing apparatus (and/or other host apparatus) to generate at least one object. One build job may include a plurality of objects or object parts.

An additive manufacturing process can be delayed when a supply of build material needs to be refilled, or when objects or parts need cleaning. Additionally, there can be time delays between build jobs. Moreover, in some instances additive manufacturing systems may demand a relatively high level of expertise and interaction from an operator, to operate the additive manufacturing system and manufacture 3D objects of acceptable quality. An example of this disclosure addresses a build module that may facilitate a relatively efficient additive manufacturing process. Another example of this disclosure describes a build module to be used in an additive manufacturing process that may reduce a need for advanced operator expertise and interaction.

Figure 1:
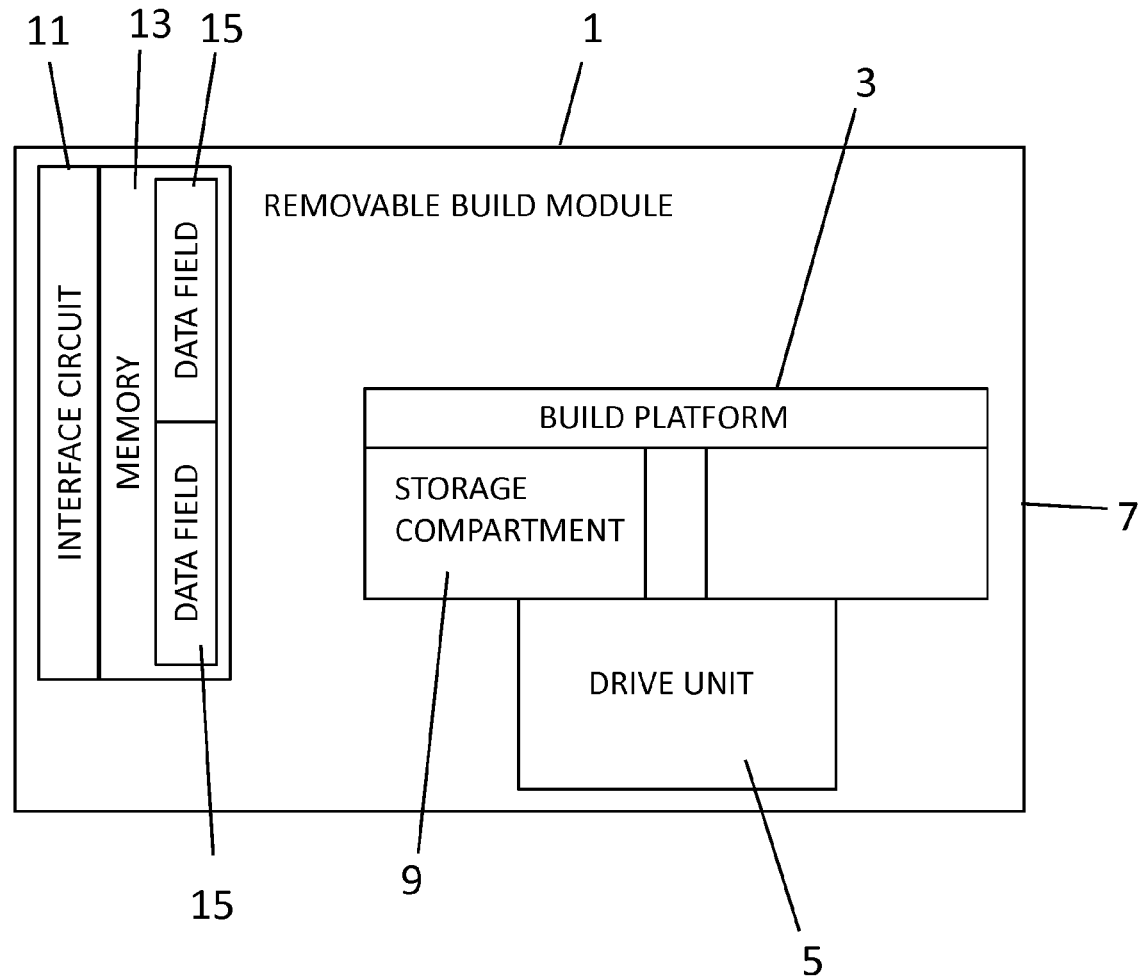
FIG. 1 illustrates a diagram of an example build module.

FIG. 1 illustrates a diagram of a removable build module 1 for three-dimensional additive manufacturing that is to be connected to and removed from a host apparatus such as a 3D printer. The build module 1 includes a build platform 3 to support build material to build a to-be-manufactured 3D object layer-by-layer. To that end, the build platform 3 may include a hardened, planar support surface that facilitates building of subsequently stacked layers. For example, the 3D printer is to distribute agents and/or energy to each consecutive layer of build material on the platform 3 so that subsequent layers merge with each other and solidify.

The build module 1 further includes a drive unit 5 to drive the platform 3 and to maintain the platform at a desired height, for example with respect to an agent distributor or energy source of an additive manufacturing apparatus. In an example, the drive unit 5 is to displace the platform 3 downwards after each consecutive layer has been processed. In some examples, the drive unit 5 includes a drive motor and an encoder. In an example, the drive unit 5 includes at least partly pneumatic or hydraulic mechanisms to drive the platform 3. In further examples, the drive unit 5 may include transmission elements such as at least one of a gear, piston, a linear motor, rack-and-pinion, a stepper motor, servo and screw-type mechanism to lift and lower the platform 3.

In an example, the build module 1 includes a housing 7 to house the platform 3, drive unit 5 and other components. The housing 7 may be defined by walls and/or a frame that may have a triple function: to form a compartment, to support internal components and to protect operators as well as its contents. In an example, the housing 7 includes a build material storage 9 to store build material in the module 1, to be used for building the object on the platform 3. The housing 7 may also house sub-housings that form compartments. The housing 7 may include an opening above the platform 3 to allow for energy and/or agents to be delivered to the build material layers on the platform 3, by the host additive manufacturing apparatus. In an example the housing includes a seal or lid or the like to be able to close such top opening, for example to protect its contents from operators and vice versa, when the build module 1 is disconnected from a host apparatus.

The build module 1 is connectable to a host apparatus. In different examples, the host apparatus includes a receiving structure adapted to receive the build module and vice versa, the build module is adapted to connect to the receiving structure. In an example, the build module 1 is connectable to a plurality of host apparatuses, for example different types of host apparatuses or similar types of host apparatuses. One type of host apparatus is an additive manufacturing apparatus, such as a 3D printer. Another type of host apparatus can be a post-processing apparatus for processing a 3D object after it has been built. Such post-processing apparatus may perform operations such as cooling of a built volume, wherein for example a built volume includes a built object as well as unbuilt powder around the object (sometimes referred to as "cake"). Another post-processing operation may include separating an object from said built volume/cake. Different cooling and separating processes may include ventilating, sieving, brushing, etc. Another example post-processing apparatus can be an apparatus to post-treat the object, for example post-treating a surface of the object, for example by applying a finishing layer or coating. Yet another example post-processing apparatus assembles different printed object parts. In one example the build module 1 is to be connected to an additive manufacturing apparatus for additive manufacturing and, after the build job is completed, be moved and connected to a post-processing apparatus.

In another example a host apparatus is a pre-processing apparatus, such as a build material (re)fill apparatus to add (further) build material to the build module 1. In one example the build module 1 is to be post-processed in a post-processing apparatus and before being reconnected to an additive manufacturing apparatus for additive manufacturing a new object, be moved and connected to a pre-processing apparatus to (re)fill the build module before additive manufacturing.

In certain examples, multiple functions are combined in a single host apparatus, that is, a single host apparatus performs additive manufacturing and also at least one of post-processing and pre-processing. In one example the pre- and post-processing are combined in a single host apparatus, that is, separate from the additive manufacturing apparatus (e.g. 3D printer). This may allow for relatively efficiently using a capacity of both host apparatuses.

The build module 1 is connectable to and removable from at least one compatible host apparatus that in turn is arranged to receive the build module 1. In an example the build module 1 is to be inserted in an additive manufacturing apparatus, in such a manner that the platform 3 is properly positioned with respect to an agent distributor and/or energy source of the additive manufacturing apparatus. The build module 1 may also be arranged to connect to other host apparatuses. The build module 1 has an interface circuit 11 to exchange data with a respective connected host apparatus. The interface circuit 11 includes a physical or contactless data transfer interface. For example a communication bus of the interface circuit 11 is to connect to a communication bus of the host apparatus. In one example, the interface circuit 11 includes a physical power interface. The host apparatus may be to transmit power from a power network to internal components of the build module 1, through the interface circuit 11.

In an example, the build module 1 can be removed from the additive manufacturing apparatus after having manufactured the object, for example to cool down the object within the build module 1, outside of the additive manufacturing apparatus. The additive manufacturing apparatus is then available to continue additive manufacturing using another, for example similar type, second build module 1 to manufacture a second object. This allows for the additive manufacturing apparatus to be employed at relatively high capacity, decreasing a down-time. In parallel, built objects in the build modules 1 can be cooled and cleaned/separated from the cake. In one example, "cleaning" refers to removing unsolidified build material around the object. Example cleaning methods include sieving, brushing, blowing, etc.

The build module 1 further includes a memory 13. The memory 13 can be a non-volatile non-transitory digital memory device. The memory 13 includes at least one data field 15 to receive and store build parameters that correspond to build material characteristics of build material and/or an object present in the build module 1. In different examples, the build parameters include pre-build job build parameters pertaining to stored build material to be used for a build job, or post-build job build parameters pertaining to the build object and build material after the build job has been completed. In this description a data field should be understood as a series of bits in a memory that are set (i.e. encoded) to represent the build parameters. The data field may be of any suitable size. For example, the data field 15 is to store a code relating to a plurality of build parameters whereby the host apparatus is to decode the code. For example at least one look-up table (LUT) of build parameters can be encoded in at least one data field 15.

In one example, when the build module 1 is empty, or new and still unused, it is void of build material. In the empty state the data field 15 may be zero or encoded so as to reflect an empty state of the build module 1. The memory 13 is configured to, when the build module 1 is filled with build material through a host apparatus, encode the data field 15 with build parameters corresponding to that build material. The memory 13 is configured to, when an object has been manufactured in the build module 1, encode the data field 15 with build parameters corresponding to that object and the surrounding build material (e.g. "cake"). During later usage(s), the interface circuit 11 is to exchange these build parameters with the host apparatus. The build parameters are then used to optimize additive manufacturing settings or pre- or post-processing settings of the host apparatus.

In one example, the stored build material has a powdered form, and some of the build parameters that are stored, or to be stored, on the memory 13, correspond to at least one of melt temperature, crystallization temperature and radiation absorptivity factor. The parameters are to be encoded on the data fields 15 by a host apparatus when filling the module 1. Further build material parameters can be encoded on the memory 13, such as at least one of a width of crystallization temperature, width of melting temperature, particle size distribution, glass transition temperature, melting enthalpy, heat conduction, heat capacity, tap powder density, melt flow index/viscosity, and shrinkage factor. These example build parameters can be used as parameters for the additive manufacturing apparatus to optimize an amount of energy to be applied to a build material layer.

In another example, the memory 13 stores at least one identifier. The identifier may be used to retrieve parameters from a memory of the host apparatus. For example, one identifier corresponds to one type of build material.

In an example, the mentioned example build parameters correspond to yet-to-be-solidified build material. Such build parameters may in an example be referred to as pre-build job parameters, which may serve as input for an additive manufacturing apparatus. Additive manufacturing settings can be adapted based on these pre-build job parameters.

In another example the build parameters include post-build job parameters, wherein parameters relating to the printed object are stored, such as for example a weight, volume, or heat conductivity of the manufactured object and/or surrounding unsolidified build material. These post-build job parameters may serve as input for a post-processing apparatus to optimize a post-process such as for example cooling, sieving, cleaning, finishing, coating, refilling, etc.

The interface circuit 11 facilitates uploading or updating of build parameters by authorized host apparatuses. The interface circuit 11 also facilitates retrieval of the build parameters by a respective authorized host apparatus. The data fields 15 are to be updated while the build material and object in the module 1 are manipulated by a host apparatus. For example, a first host apparatus uploads the updated build parameters to the fields 15 so that the module 1 can be readily removed from the first host apparatus, during or after a respective process, and connected to a second host apparatus to which the updated build parameters are communicated. The build parameters communicate a state of the build material. Hence, the second host apparatus can apply a customized process to the build material and/or object, using the build parameters updated by the first host apparatus. The operator does not need to enter or update the build parameters before connecting the build module to a host apparatus. Thereby, an operator input or interference can be kept low.

Figure 2:
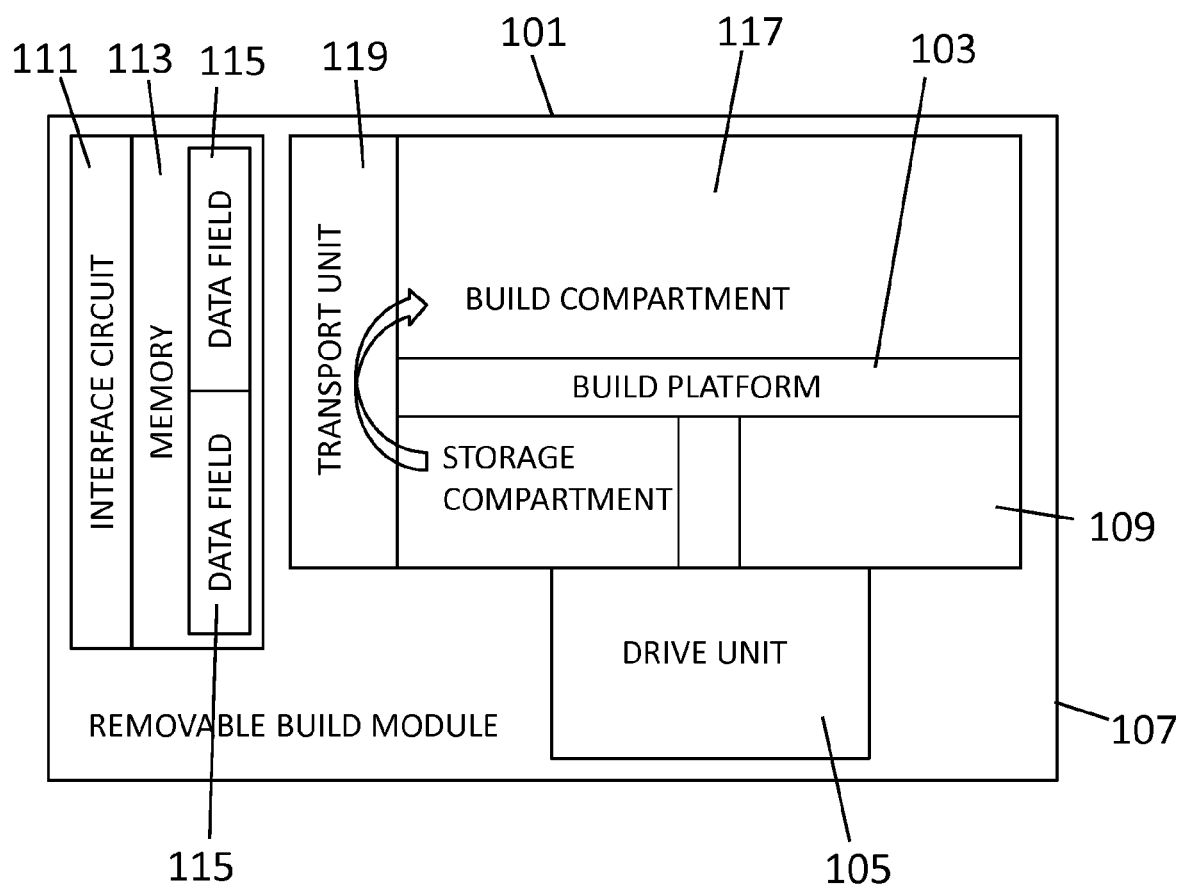
FIG. 2 illustrates a diagram of another example build module.

FIG. 2 illustrates another example of a removable build module 101. The build module 101 includes a build platform 103 driven by a drive unit 105. The build module 101 further includes a common housing 107 that houses the drive unit 105 and the platform 103 in both lowered and extended position. The build module 101 further includes an interface circuit 111 to interconnect with an interconnect circuit of a host apparatus, in order to connect to a power circuit and to serve as a data interface with the host apparatus. Circuitry of the module 101 further includes a non-volatile non-transitory memory 113 that includes at least on data field 115 for storing build parameters, or a build material identifier for retrieving build parameters of the build material from a separate memory.

The housing 107 includes a storage compartment 109 for storing build material for a build job and a build compartment 117 for containing respective build material and object layers during and after the build job. In one example the build platform 103 separates the storage compartment 109 and the build compartment 117. The arrangement is such that, while the build platform 103 lowers, build material is transported from the storage compartment 109 below the platform 103 to the build compartment 117 above the platform 103, and through said lowering a volume of the storage compartment 109 is decreased, and a volume of the build compartment 117 is increased. The accumulated volume of the storage and build compartment 109, 117 may be kept relatively constant. Hence, a relatively space efficient overall build material storage 109, 117 may be obtained. Also, a travel distance of stored build material from the storage compartment 109 to the build compartment 117 may be kept relatively small.

In this example, a transport unit 119 is provided to transport the build material from the storage compartment 109 to the build compartment 117. The transport unit 119 may be disposed next to the build platform 103 to transport the build material from below the platform 103 to above the platform 103. In one example, the transport unit 119 includes a screw or spiral-type transport mechanism enclosed by a transport channel. In other examples, the transport unit 119 includes conveyor belts, dragging mechanisms or pneumatic conveying systems such as dense phase conveying or dilute phase conveying. In different examples, the transport unit 119 can be provided on one side of the platform 103 or on both sides of the platform 103. In an example, the transport unit 119 is to deliver the build material at least up to a top side edge of the platform 103, from where the build material can be distributed over the surface of the platform 103 or over a previous layer. Distribution of layers of build material over the surface of the platform 103 can be effected by distribution members such as rollers, shovels or wipers. In one example, these distribution members are part of the additive manufacturing apparatus. In another example, these distribution members are part of the build module 101.

The at least one data field 115 is to store pre-build job build parameters pertaining to the build material in the storage compartment 109. The at least one data field 115 is also to store post-build job build parameters pertaining to the object and build material in the build compartment 117. The at least one data field 115 stores states of internal build module drive components such as the drive unit 105 and the transport unit 119. For example, the state of each component may include information referring to a height, rotational position, or other state of the respective drive component 105, 119.

Figure 3:
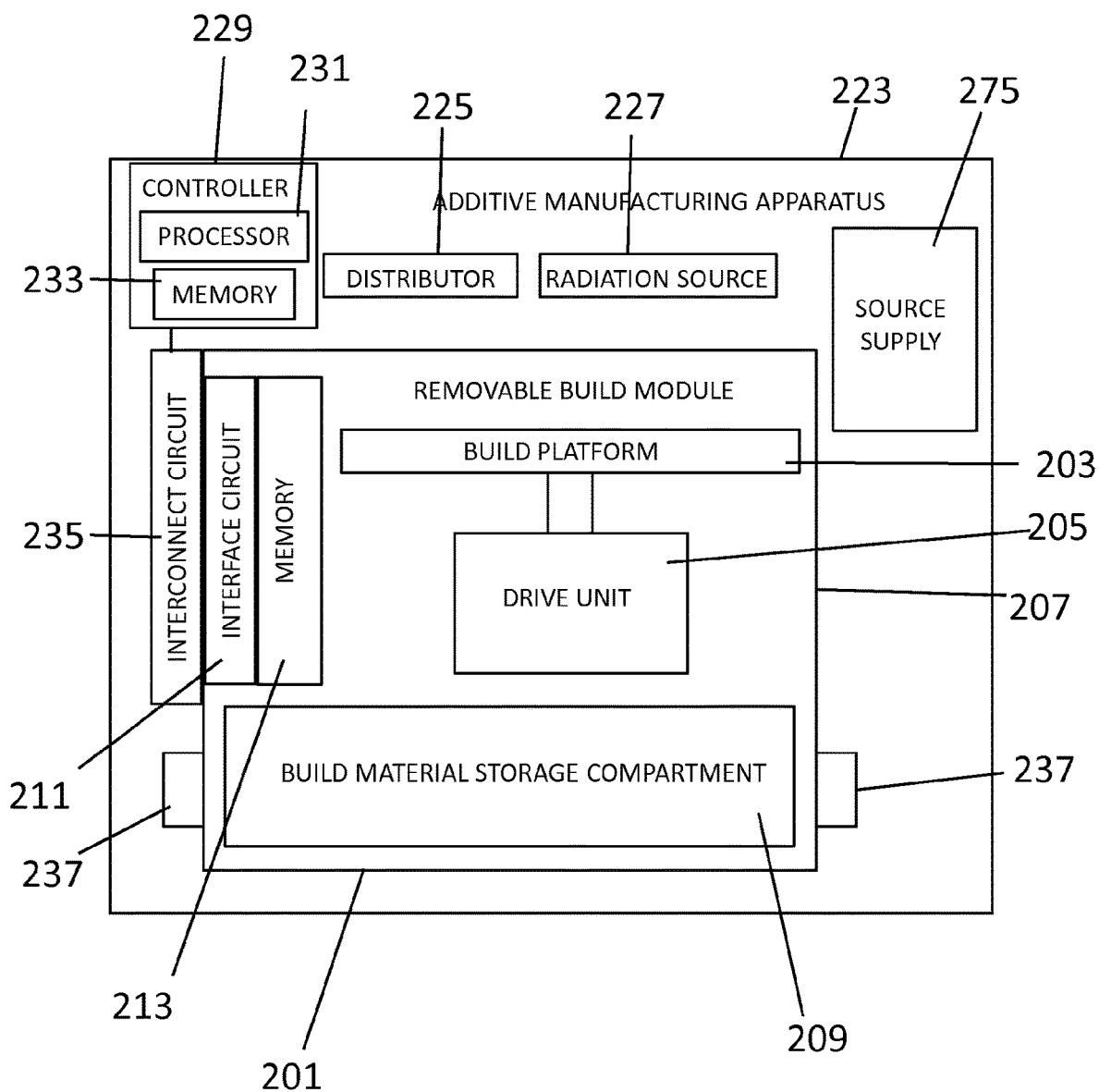
FIG. 3 illustrates a diagram of an example build module connected to an example host additive manufacturing apparatus.

FIG. 3 illustrates an example build module 201 installed in an additive manufacturing apparatus 223. In an example, the additive manufacturing apparatus 223 is referred to as a 3D printer. The additive manufacture apparatus 223 is to receive the build module 201. To that end, the additive manufacturing apparatus 223 is provided with a receiving structure.

The additive manufacturing apparatus includes an agent and/or print fluid distributor 225 to distribute agents and/or print fluid to portions of layers of build material on a build platform 203 of the build module 201. In one example, the agent is a coalescence agent to facilitate solidification of the build material by radiation. The additive manufacturing apparatus 223 may include a radiation source 227 to emit heat and/or light of a predetermined wavelength range onto layers of build material on the platform 203.

In different examples, the build material on the platform 203 can be supplied from the build material storage compartment 209 in the build module 201, or from a separate replaceable source supply 275 that is to be connected to the additive manufacturing apparatus 223. In a further example, a source supply 275 is to supply build material to the storage compartment 209 of the build module 201, from where it is transported to the build platform 203. The additive manufacturing apparatus includes a second receiving structure for the source supply of build material. In other examples, the build material source supply 275 is to be connected to host apparatuses other than the additive manufacturing apparatus 223 and the build module 201 needs to be filed in the other host apparatus(es) other than the additive manufacturing apparatus 223. In such example the source supply 275 and the build module 201 may be connected to a separate host apparatus that is not the additive manufacturing apparatus, for filling the build module 201.

In the example of FIG. 3, the additive manufacturing apparatus 223 includes a controller 229 that controls the distributor 225 and the radiation source 227. The controller 229 includes a processor 231, such as a microprocessor, computer processor and/or microcontroller. The processor 231 may include at least one integrated circuit, other control logic, other electronic circuits or combinations thereof. The controller 229 may include a programmable gate array, an application specific integrated circuit (ASIC). The controller 229 may include a digital and analogue ASIC, including digital to analogue (D/A) converters. The controller 229 may further include a non-volatile non-transitory computer-readable memory 233. At least one communication bus can be provided to allow for communication between the memory 233 and the processor 231. The memory 233 may be part of or separate from an ASIC. In different examples the memory 233 can include a random access memory (RAM), static memory, read only memory, an electrically erasable programmable read-only memory (EEPROM), a hard drive, an optical drive, a storage drive, or the like. The memory 233 may store instructions that when executed by the processor 231 drive components such as the agent distributor 225, the radiation source 227 and/or build module components such as the drive unit 205. These instructions may include fixed factory calibration parameters as well as variable build parameters retrieved from a memory 213 of the build module 201. The controller 229 may drive the drive unit 205 directly or may instruct a slave controller present in the build module 1 wherein the slave controller instructs the drive unit 205.

The additive manufacturing apparatus 223 includes an interconnect circuit 235. The interconnect circuit 235 may include a communication bus and contact circuitry. The controller 233 connects to an interface circuit 211 of the build module 201 through the interconnect circuit 235.

In one example, the additive manufacturer apparatus 223 includes a receiving structure in which the build module 201 can be fitted. The receiving structure may be represented by a hollow space in the additive manufacturing apparatus 223. The interconnect circuit 235 may be provided in the receiving structure to connect to the interface circuit 211 of the build module 201 at insertion. Guide structures 237 can be provided in the receiving structure to guide the build module 201 until a proper contact is established between the interconnect circuit 235 and the interface circuit 211, and also until the build platform 203 is correctly positioned with respect to the agent distributor 225 and the radiation source 227. For example the guide structures 237 are engaged by moving the build module 201 into the receiving structure. In one example a proper contact is established once the build module 201 is substantially completely inserted into the receiving structure and the build platform 203 is properly positioned with respect to the agent distributor 225 and the radiation source 227. The guide structures 237 may include walls, rails, bars or protrusions that are to engage a housing 207 of the build module 201 at insertion of the build module 201 to guide the build module 201. The build module housing 207 may include corresponding walls, rails, bars, protrusions, notches, slots, etc.

Figure 4:
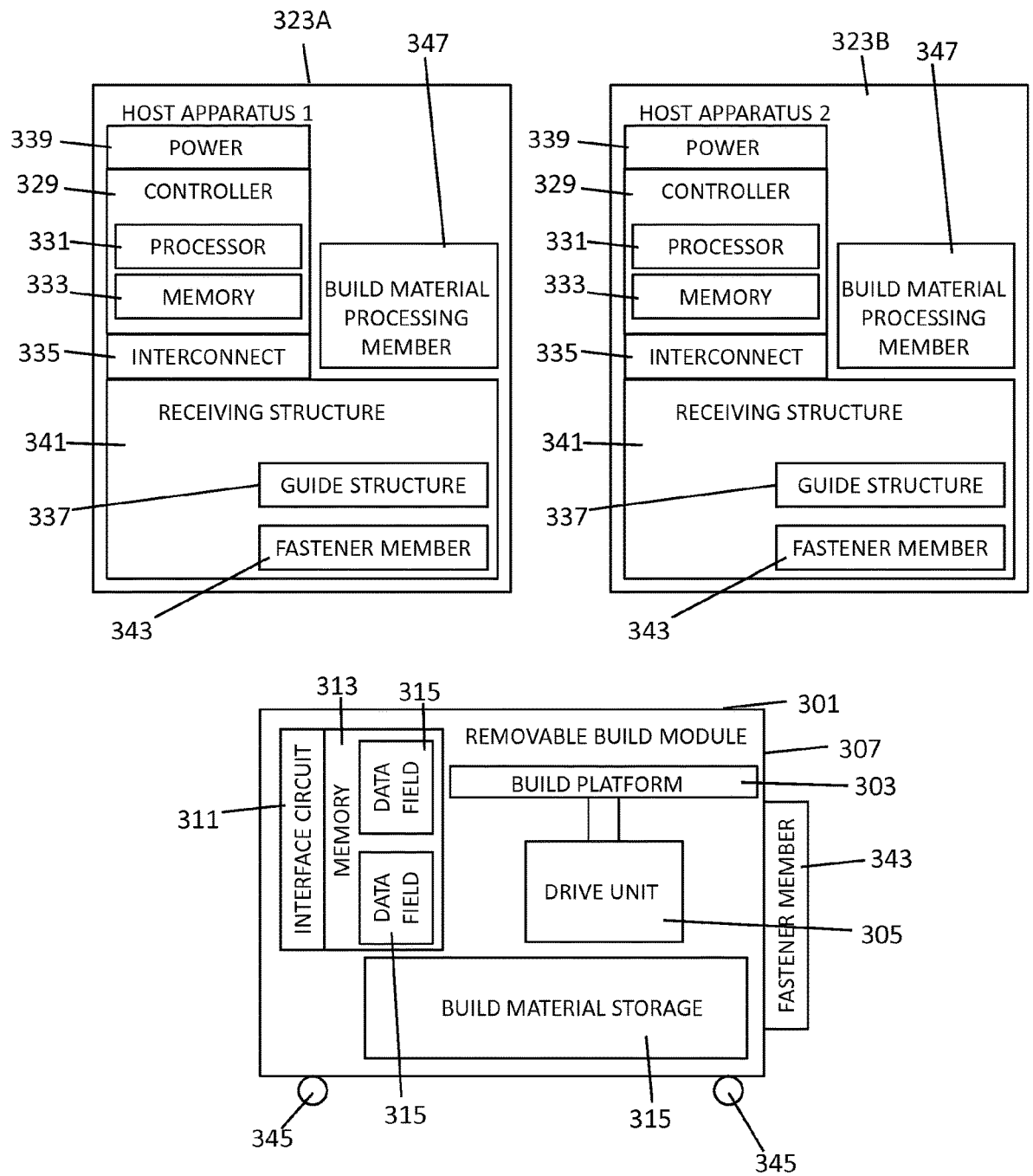
FIG. 4 illustrates a diagram of an example of a build module with two compatible host apparatuses.

FIG. 4 illustrates an example of a build module 301 and two host apparatuses 323A, 323B. In one example, the host apparatuses 323A, 323B are different types of host apparatuses 323A, 323B, for example an additive manufacturing apparatus and a post-processing apparatus. In another example, the host apparatuses 323A, 323B are of a similar type, for example each is an additive manufacturing apparatus. In both examples, the memory 313 of the build module 301 is to be interchangeably connected to either one or the other host apparatus 323A, 323B and receive and communicated updated build parameters from and to the host apparatuses 323A, 323B.

Each host apparatus 323A, 323B includes circuitry that includes an interconnect circuit 335, a controller 329 having a processor 331 and a memory 333, and a power circuit 339. Each host apparatus 323A, 323B includes a receiving structure 341 to receive the build module 301. Each receiving structure 341 includes a guide structure 337 to guide the build module 301 into a correct position with respect to the host apparatus 323A, 323B. In an example, each receiving structure 341 includes a fastener member 343 to fasten the build module 301 in a correct, fixed position with respect to the host apparatus 323A, 323B. When fastening the build module 301, it is latched or locked to the respective host apparatus 323A, 323B.

The build module 301 includes an interface circuit 311 to connect to the interconnect circuit 335. The build module 301 further includes a housing 307. The build module 301 includes a fastener member 345 that is to fasten to a corresponding fastener member 343 of the receiving structure 341 of the host apparatus 323A, 323B, to fix the build module 301 to the host apparatus 323A, 323B and maintain both in a fixed position with respect to each other.

The build module 301 may include wheels 345 at the bottom to drive the module 301 from one host apparatus 323A to another host apparatus 323B. Each host apparatus 323A, 323B is provided with a respective build material processing member 347. For example, the build material processing member 347 can be an agent distributor, heat/light radiation source, (re)fill unit, cooling device or cleaning device, depending on the type of host apparatus 323A, 323B. An example cooling device is a ventilator. An example cleaning device is a brush or ventilator.

The build module 301 includes a memory 313. The memory 313 stores at least one data field 315. The at least one data field 315 is to store build parameters based on characteristics of build material in the build material storage compartment 309. The build parameters are to be communicated to the host apparatuses 323A, 323B. After each build job, post-process or pre-process, the data field 315 is updated by the host apparatus 323A, 323B. In one example, the host apparatus adds build parameters without completely removing old build parameters already stored in the data field 315, for example when new build material is added to old, different type build material still present in the storage compartment 309 so that a mix of different build materials is present in the storage compartment 309. In another example the host apparatus 323A, 323B replaces old build parameters with new build parameters when applying or after having applied its respective process on the build material or object, for example to reflect a new state of the build material or all new build material in the storage compartment 309.

In one example, the memory 313 is to communicate build parameters from one host apparatus 323A to the other host apparatus 323B. For example once a first host apparatus 323A has processed (e.g. 3D printed) a portion of the build material, it updates the build parameters on the memory 313 (e.g. corresponding to an object and build material on the platform 303). Then, the build module 301 is connected to the second host apparatus 323B (e.g. post-processing apparatus) where the updated build parameters are communicated to the second host apparatus 323B so that the second host apparatus 323B optimizes its build material process settings (e.g. cooling time or temperature settings) accordingly. For example a volume or weight of build material or a printed object on the platform 303 could influence cooling settings or cooling time.

Figure 5:
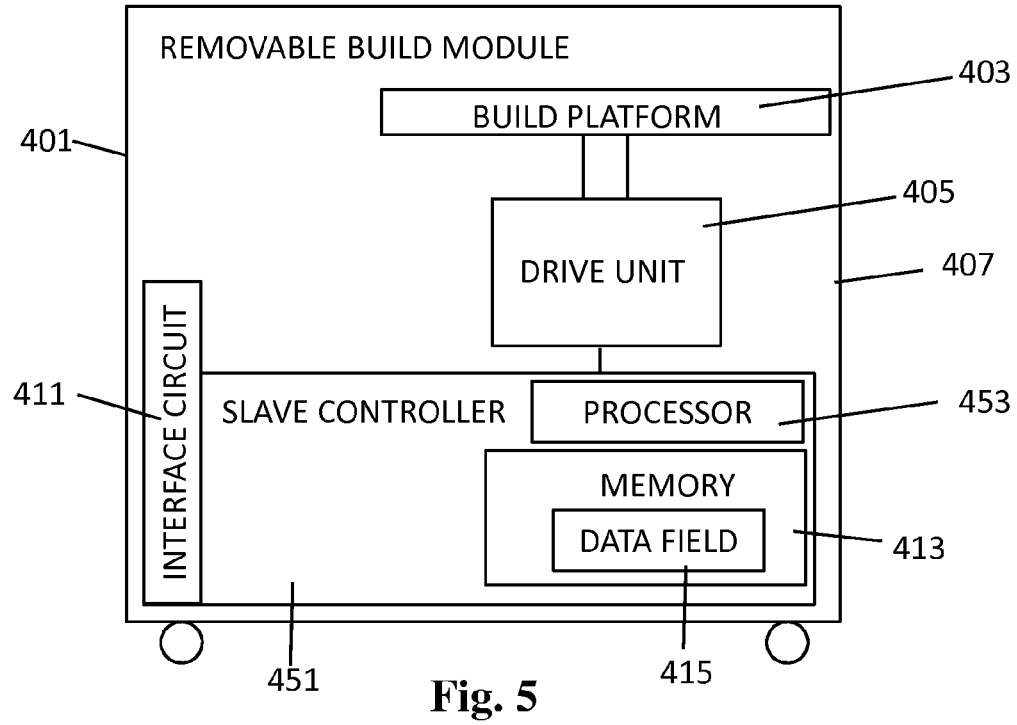
FIG. 5 illustrates a diagram of an example of a build module.

FIG. 5 illustrates another example of a removable build module 401. The build module 401 includes a build platform 403 and a drive unit 405 therefor. The build module circuitry includes an interface circuit 411 to contact a power and a data interface of a host apparatus. The build module circuitry includes a controller 451 to control the drive unit 405, and for example other build module components such as a transport unit. In this example, the controller is a slave controller 451. The slave controller 451 is to instruct the drive unit 405 based on instructions stored on a memory 413 of the module 401 subject to instructions of a master controller of the host apparatus. Certain build parameters stored the memory 413 can be used by the slave controller 451 to control the drive unit 405.

The slave controller 451 includes a processor 453, such as a microprocessor, computer processor and/or microcontroller. The processor 453 may include at least one integrated circuit, other control logic, other electronic circuits or combinations thereof. The slave controller 451 may include a programmable gate array and/or an application specific integrated circuit (ASIC). The slave controller 451 may include a digital and analogue ASIC, including digital to analogue (D/A) converters. The analogue ASIC may drive the drive unit 405. The slave controller 451 may further include a non-volatile non-transitory computer-readable memory 413. At least one communication bus can be provided to allow for communication between the memory 413 and the processor 453. The memory 413 may be part of, or separate from, an ASIC. In different examples the memory 413 can include a random access memory (RAM), static memory, read only memory, an electrically erasable programmable read-only memory (EEPROM), a hard drive, an optical drive, a storage drive, or the like. The memory 413 stores instructions that when executed by processor 453 drive components such as the drive unit 405 and a transport unit for transporting build material in the build module 401. The instructions may include factory calibration settings and variable build parameters to be stored in at least one dedicated data field 415 of the memory.

Figure 6:
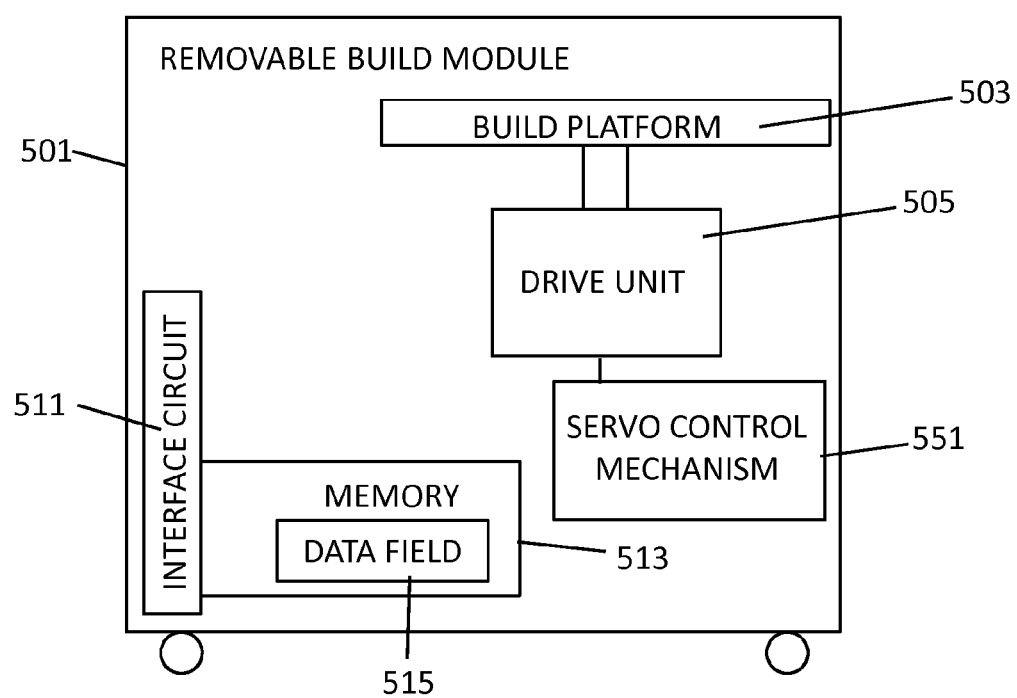
FIG. 6 illustrates a diagram of another example of a build module.

Another example build module 501 is illustrated in FIG. 6. The build module 501 includes a drive unit 505 and platform 503. The drive unit 505 may be driven by a master controller of a host apparatus. Build module 501 circuitry is provided that includes an interface circuit 511 and a memory 513. The memory 513 stores at least one data field 515 that is to store build parameters. The build module 501 includes a servomechanism 551 that is to apply closed loop control to control the drive unit 505. To that end, the drive unit 505 may be provided with an encoder from which the build platform position can be derived. The servo control mechanism 551 is to compare the input of a master controller of the host apparatus with an output of the encoder and provide feedback to the master controller, to correct an incorrect position of the build platform 503.

Figure 7:
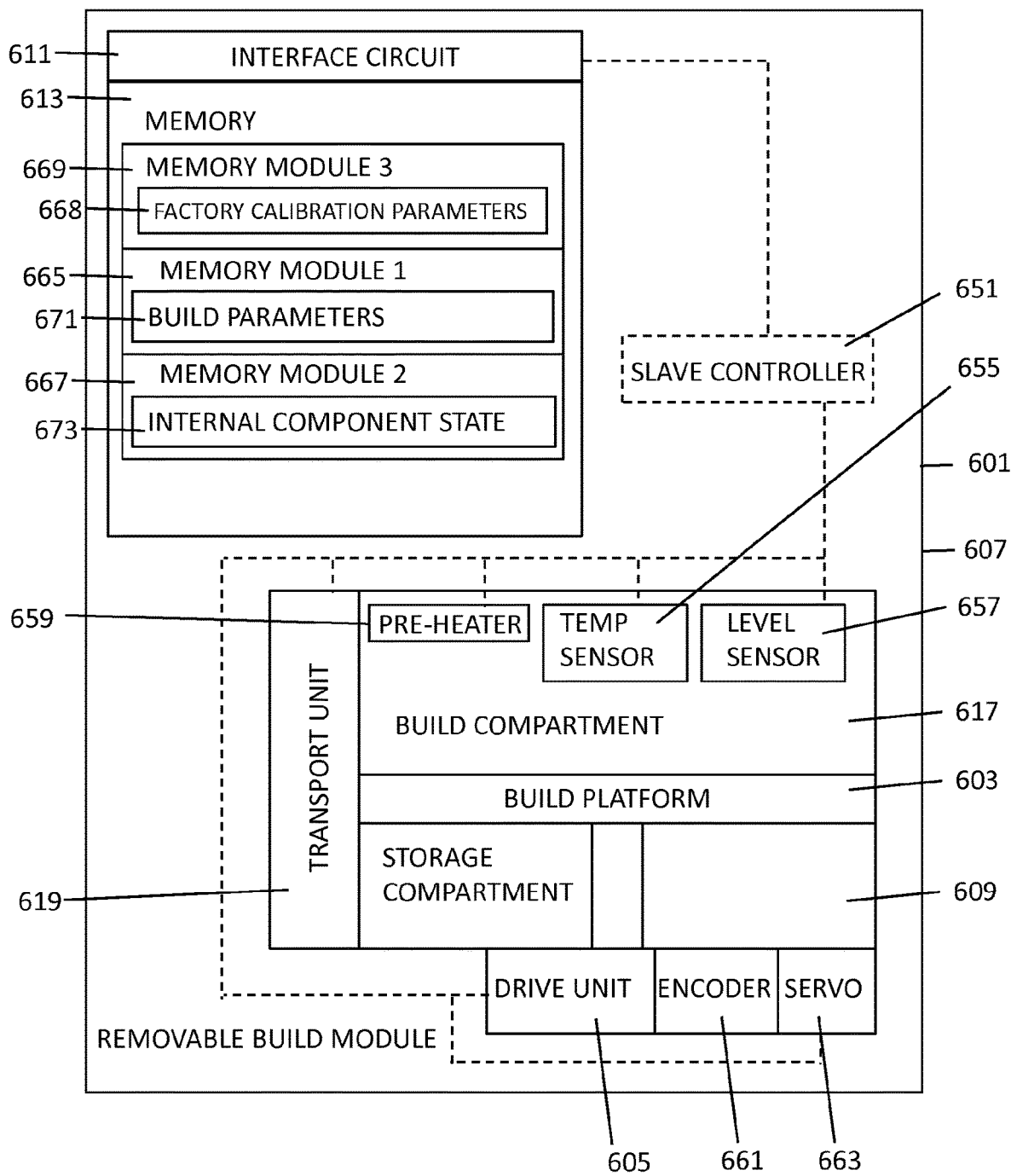
FIG. 7 illustrates a diagram of yet another example of a build module.

FIG. 7 illustrates another example of a build module 601. The build module 601 includes a drive unit 605 and a build platform 603 driven by the drive unit 605. The build module 601 includes a build material storage compartment 609 to store build material to be transported to the platform 603 and a build compartment 617 to build an object. A common housing 607 of the module 601 houses the platform 603, build compartment 617 and storage compartment 609. The build module 601 further includes a transport unit 619 to transport build material from the storage compartment 609 to the build platform 603, for example at least up to a side of the build platform 603, from where the build material may be evenly distributed over the platform 603 or over a previous layer by a separate distribution mechanism.

In an example, the module 601 includes at least one temperature sensor 655. The at least one temperature sensor 655 can be provided in the build compartment 617, for example attached to the platform 603 or to walls of the build compartment 617. A plurality of temperature sensors 655 can be provided to obtain a temperature map of the build layers, for example to obtain a temperature of both solidified and non-solidified portions of the build material layers. Other temperature sensors 655 can be provided in the storage compartment 609. In different examples, the at least one temperature sensor 655 can provide temperature data of the build material and object during additive manufacturing to control the additive manufacturing process, and after additive manufacturing to control the cooling process. Obtained temperature data can be used to indicate when an object has sufficiently cooled or hardened, for example to enable cleaning and removal of the object from the module. In certain examples, reading and interpreting the sensor signals may allow for interpretation of a state of an object in a post-build process. In another example, a read temperature in the storage compartment 609 may be used to set build material pre-heat conditions.

In an example, the module 601 includes at least one level sensor 657 to sense a top surface of the build material in the build compartment 617. In an example the level sensor 657 is a printhead to powder spacing (PPS) sensor. The level sensor 657 can be an optical sensor or any electromagnetic radiation emitting and sensing device. The level sensor 657 may be provided near a top and/or side walls of the build compartment 617 to sense a top level of a top layer of build material. In an example, the level sensor 657 can provide corrective feedback to a controller if a layer level is outside of a predefined suitable height range. In certain examples the level sensor can be provided in the host apparatus.

In another example, the module 601 includes pre-heaters 659 to pre-heat layers of build material. The preheaters 659 may be disposed in the build compartment 617 to pre-heat the build material on the platform 603 before actual agent and radiation distribution, to accelerate melting and/or coalescence of the build material. In one example, the pre-heaters 659 are disposed on the platform 603 and/or on walls of the build compartment 617. In other examples pre-heaters 655 are disposed in the transport unit 619 and/or the storage compartment 609 and/or separate distribution mechanisms. In one example, the pre-heaters 659 are activated when a sensed temperature in the build or storage compartment is below a certain threshold. In another example, the pre-heaters are to be automatically intermittently activated, for example between consecutive layer distributions. In yet another example, the pre-heaters are activated depending on the build parameters. For example the pre-heaters are to be activated depending on build material characteristics.

In an example, the pre-heaters 659, temperature sensors 655 and level sensors 657 are controlled by a slave controller 651 in the module 601. The slave controller 651 can monitor the sensors and provide feedback to a master controller of a host apparatus only when corrective action is necessary. The slave controller 651 can also proactively control the pre-heaters 659, for example based on signals from the sensors 655, 657. In another example, a master controller of the host apparatus directly controls the sensors 655, 657 and pre-heaters 659 via an interface circuit 611 of the module 601. In a further example, a servomechanism 661 and encoder 663 may be connected to the drive unit 605 and/or transport unit 619 to provide corrective feedback to the slave controller 651 or directly to the master controller. In yet another example, the servomechanism 661 checks the sensors 655, 657 and/or pre-heaters and provides corrective feedback to the slave or master controller, where necessary.

The interface circuit 611 is to connect to a power source of the host apparatus to transmit current to the drive unit 605, the transport unit 619, the pre-heater 659 and the sensors 655, 657. In an example, the interface circuit 611 may also transmit sensor signals of the drive unit 605, the transport unit 619, the pre-heater 659 and/or the sensors 655, 657 to the host apparatus, for example for interpretation by the master controller. In further examples the build module 601 includes further sensors such as pressure sensors or gas sensors, for example to sense a pressure in the build compartment or to sense an amount of gas such as oxygen.

The build module 601 includes a memory 613 that is divided into different memory modules 665, 667, 669. In different examples, each memory module 665, 667, 669 may be defined by a separate data field or group of data fields in one physical memory device, a separate partition in one physical memory device, separate physical memory devices, or combinations of those. For example two of the memory modules 665, 667, 669 could be defined by partitions on a single, common physical memory device, while one of the modules 665, 667, 669 could be part of another separate physical memory device.

A first memory module 665 is to store the build parameters 671. The build parameters may be based on the build material and/or a manufactured object. The first memory module 665 may include at least one data field to store pre-print job parameters, for example based on characteristics of the build material in the storage compartment 609, and at least one data field to store post-print job parameters, for example based on characteristics of build material and objects in the build compartment 617. In one example, the build parameters are to be encoded in the first memory module 665 for a first time when the build module 601 is filled for a first time. The post-build job parameters may be based on characteristics of the printed object or the surrounding build material in the build compartment 617, for example a volume and/or weight of the printed object, or a number of cycles of the respective build material, or other characteristics. A value of accumulated build job cycles may be stored on the build module memory 613. The accumulated job cycle value may be used to re-calibrate the build module 601 and/or initiate a maintenance routine.

A second memory module 667 stores data relating to a state 673 of at least one internal component of the build module 601. The at least one internal component may include the drive unit 605, build platform 603, transport unit 619, pre-heater 659, temperature sensor 655, level sensor 657 and/or other sensor. In one example the memory 613 is connected to said at least one internal component through a communication bus and/or through a controller 651 to write the state to the memory 613. In another example, a master controller reads the state and writes it to the second memory module 667. States stored by the second memory module 667 include motor status, system errors, a printing platform position, historical current and voltages of drive motors, number of build job cycles, and more. Further states may include a temperature of the build compartment or storage compartment and historical values of the same.

A third memory module 669 stores factory calibration parameters 668. The factory calibration parameters 668 may be part of the firmware of the build module 601 and may be fixed throughout the lifetime of the build module 601, or the build module 601 may re-calibrated after a certain number of cycles as read from the second memory module 667. The calibration parameters 668 may be protected from tampering by encryption or other special encoding.

In one example, the first and second memory module 665, 667 store variable parameters based on changing states of internal components and build material in the build module 601 during and between build jobs, while the third memory module 671 stores firmware including fixed instructions to drive the internal components that are the same over a relatively high amount of print jobs.

Figure 8:
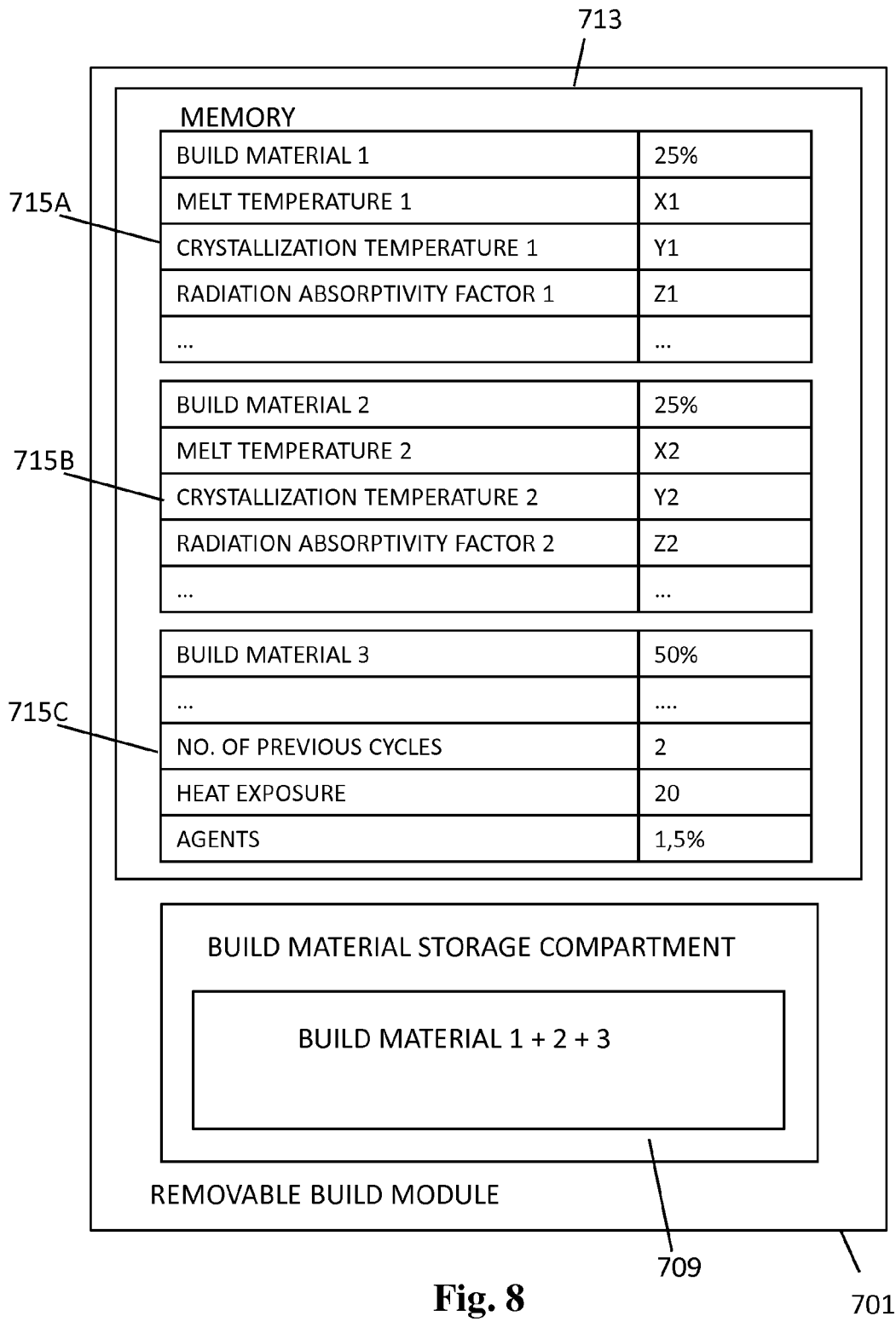
FIG. 8 illustrates a diagram of yet another example of a build module.

FIG. 8 illustrates another example of a build module 701. The build module 701 includes a build material storage compartment 709 to store the build material. The build module 701 may further include a drive unit, build platform, build compartment, interface circuit and other components, for example as described in various examples above. In the example of FIG. 8, the storage compartment 709 contains a first, a second and a third build material, each having at least one distinct characteristic. For example, the first build material may consist of fresh build powder. The second build material may consist of a powder that is different than the first build material. The third build material may be a previously used powder, wherein the previously used powder has been heated but not solidified in a previous build job. In an example, the first build material has different characteristics than the second build material but both have an at least partly overlapping melt temperature range.

For each different build material, a corresponding LUT is encoded in the corresponding data field 715A, 715B, 715C. The memory includes three corresponding data fields 715A, 715B, 715C, wherein each data field 715A, 715B, 715C is encoded with build material parameters pertaining to one of the build materials in the storage 709. A first data field 715A is encoded with build parameters of the first build material. For example, the first build material is a new, fresh build material having a melt temperature of X1, a crystallization temperature of Y1 and a radiation absorptivity factor of Z1. A second data field 715B is encoded with build parameters of the second build material. For example, the second build material is a new, fresh build material different from the first build material. The second build material has a melt temperature of X2, a crystallization temperature of Y2 and a radiation absorptivity factor of Z2. In one example, the melt temperature X2, crystallization temperature Y2 and radiation absorptivity factor Z2 of the second build material, or ranges thereof, are close enough to those of the first build material to allow that the first and second build material can be 3D printed in mixed condition.

A third data field 715C is encoded with build parameters of the third build material. For example, the third build material is a previously used build material similar to the first build material. The third build material is distinct from the first build material because it has been used but not solidified in a previous build job. In an example, the third build material may have some or most build parameters similar to the first build material. In one example the third build material has at least one build parameter different than that of the first build material. As an illustrative example, a radiation absorptivity factor may be lower than that of the first build material because the radiation absorptivity factor of the third build material was affected in a previous build job. For example, when a build material has been used in previous cycles, portions of that build material may have received heat-radiation, inhibitor agents or other treatments, which may have an effect one or more of the material's characteristics. The build parameters are updated accordingly. As illustrated, the data fields 715A, 715B, 715C may be encoded with additional build parameters that relate to previous build job cycles such as parameters based on a number of previous cycles, heat exposure, agents received, etc. Accordingly, each time a build module is refilled by a host apparatus with build material of a previous build job, the build parameters are updated.

One of the build parameters stored in each data field 715A, 715B, 715C of the memory 713 may relate to either an absolute or relative quantity of each build material. In the example of FIG. 8, this is illustrated by the top row of each LUT of each build material.

The memory 713 is to communicate the build parameters to a host apparatus, so that the host apparatus can adapt its treatment. As an illustrative example, the host apparatus may distribute extra amounts of stimulating agents or extra amounts of radiation when a portion of the build material includes previously used build material.

In another example that is not illustrated, the different build parameters that pertain to each build material are encoded in a single LUT, on the memory 713.

Figure 9:
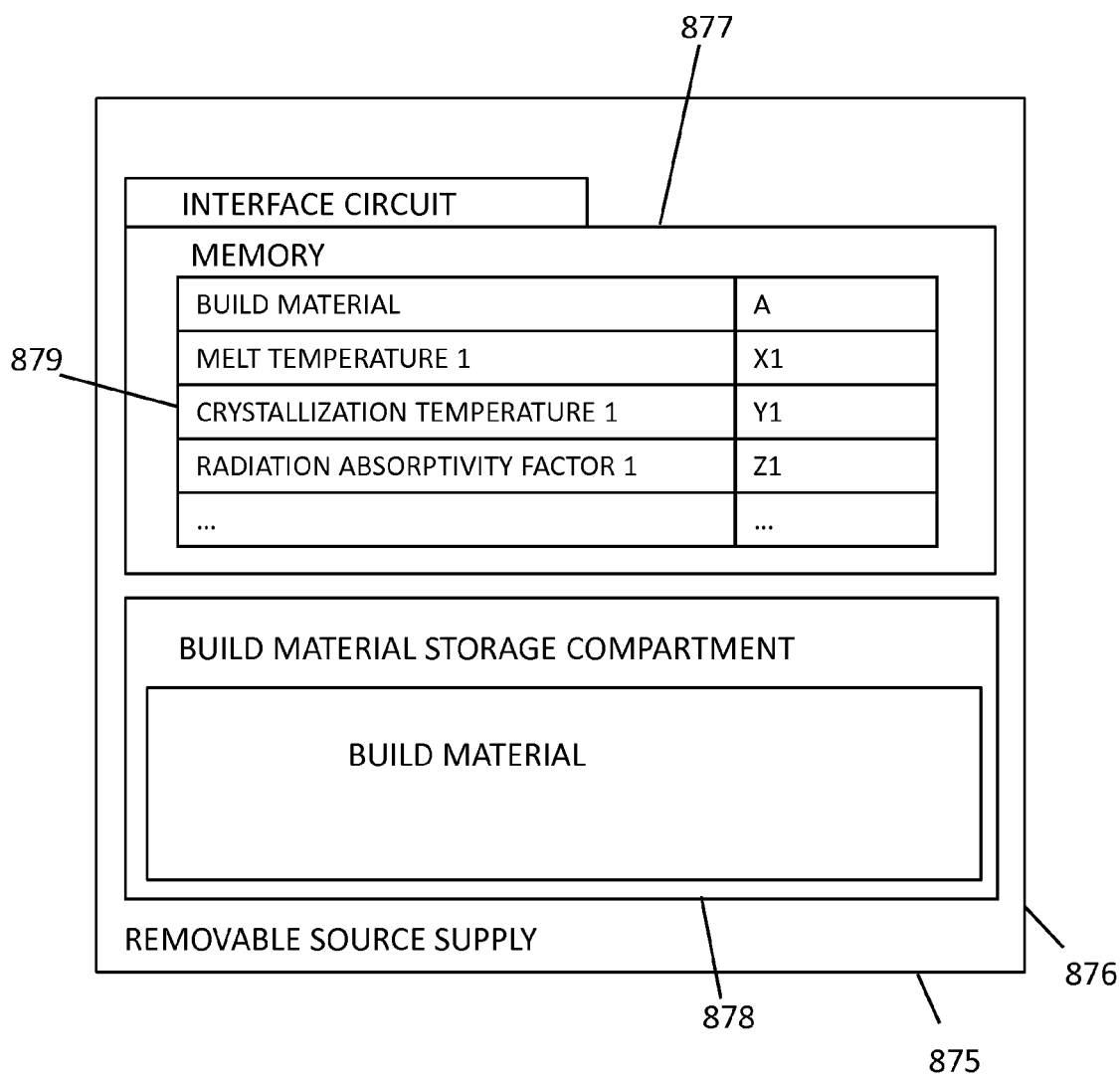
FIG. 9 illustrates a diagram of yet another example of a source supply.

FIG. 9 illustrates an example of a source supply 875 of build material. The source supply 875 includes a housing 876 and internal walls that form a compartment 878 to store the build material. The source supply 875 stores a single type of build material, such as powder. In one example, the build material is a fresh, unused build material that has not previously been used to build a 3D object. The source supply 875 includes a memory 877. The memory 877 is provided with at least one data field 879. The at least one data field 879 stores build parameters corresponding to the build material in the supply 875. The source supply 875 includes an interface circuit 874 near its exterior. The memory 877 is connected to the interface circuit 874 to exchange data with a second receiving structure that has a corresponding interconnect circuit. The source supply 875 may be adapted to connect to the second receiving structure of a host apparatus. In another example the second receiving structure is part of a build module. In a connected state, the build parameters are exchanged with the host apparatus.

In one example, the source supply 875 stores powder, and the build parameters are based on the material's melt temperature, crystallization temperature and/or radiation absorptivity factor. Further build parameters can be encoded on the memory 877, such as at least one of these parameters: width of crystallization temperature, width of melting temperature, particle size distribution, glass transition temperature, melting enthalpy, heat conduction, heat capacity, tap powder density, melt flow index/viscosity, and shrinkage factor. When the build material of the supply 875 is provided to the build module, the corresponding parameters are uploaded to the memory of the build module, for example via the host apparatus to which both the source supply and the build module are connected.

Figure 10:
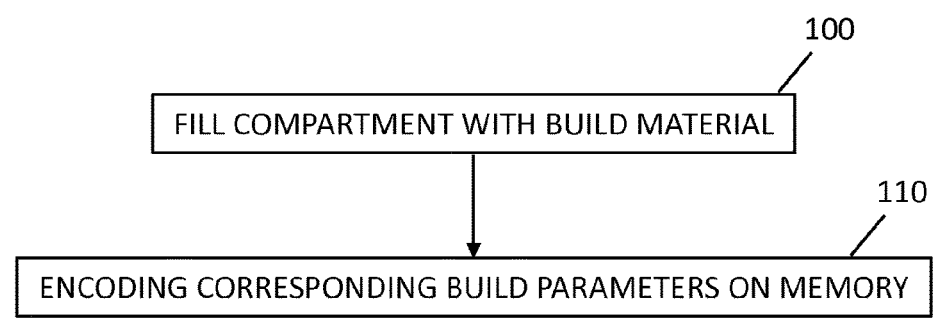
FIG. 10 illustrates a flow chart of an example method of storing build parameters on a memory of a build module.

FIG. 10 illustrates an example of a method of storing build parameters on a memory of a build module for additive manufacturing. The method includes filling a compartment of the module with build material (block 100). The method further includes encoding corresponding build parameters on the memory (block 110). The build parameters can be encoded by a host apparatus to which the build module is connected. The build parameters may originate from a memory of a source supply.

Figure 11:
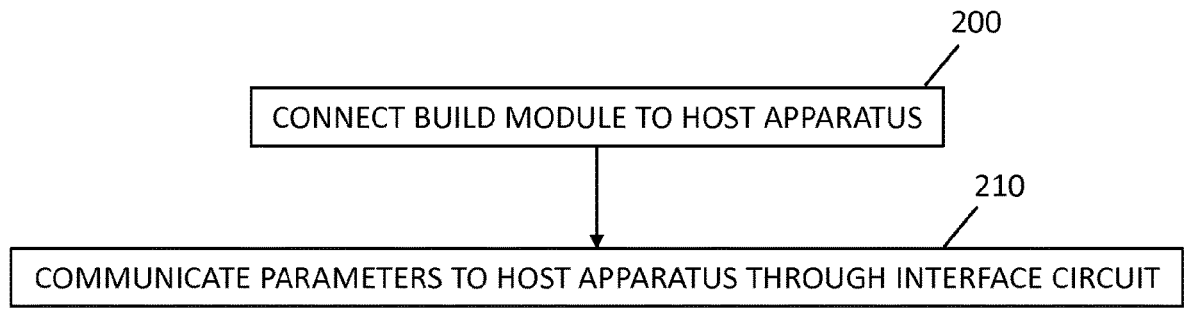
FIG. 11 illustrates a flow chart of an example method of communicating the build parameters to a host apparatus.

FIG. 11 illustrates a flow chart of an example of a method of communicating build parameters from a build module to a host apparatus in additive manufacturing. The method includes connecting a build module to a host apparatus (block 200). The connecting includes connecting an interface circuit of the build module to an interconnect circuit of the additive manufacturing apparatus. The method further includes communicating the build parameters to the host apparatus through an interface circuit of the build module (block 210).

Figure 12:
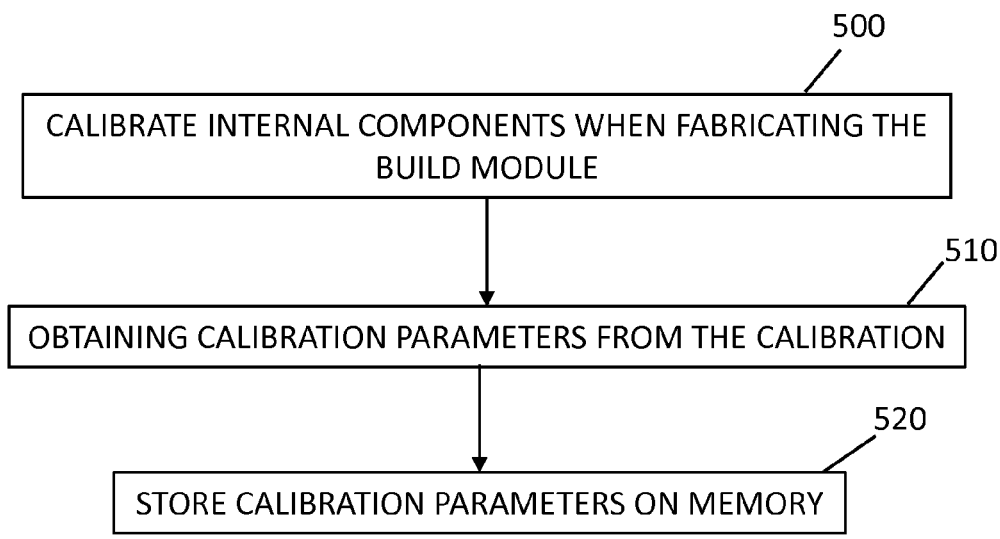
FIG. 12 illustrates a flow chart of an example method of storing calibration parameters on a memory of a build module.

FIG. 12 illustrates a flow chart of a method of calibrating internal components of a build module for additive manufacturing. Typically, tolerances and margins of internal components require that some calibration is necessary during fabrication, even between equal designs. Hence, in one example the build module stores calibration parameters. The method of calibration includes calibrating the internal components when fabricating the build module (block 500), wherein the internal components may include at least one of a drive unit for a build platform, a transport unit, pre-heaters and sensors such as temperature sensors and level sensors. The method further includes obtaining calibration parameters from the calibration (block 510). The method further includes storing the calibration parameters on a memory of the build module (block 520). The calibration parameters may be part of firmware of the build module's memory.

Figure 13:
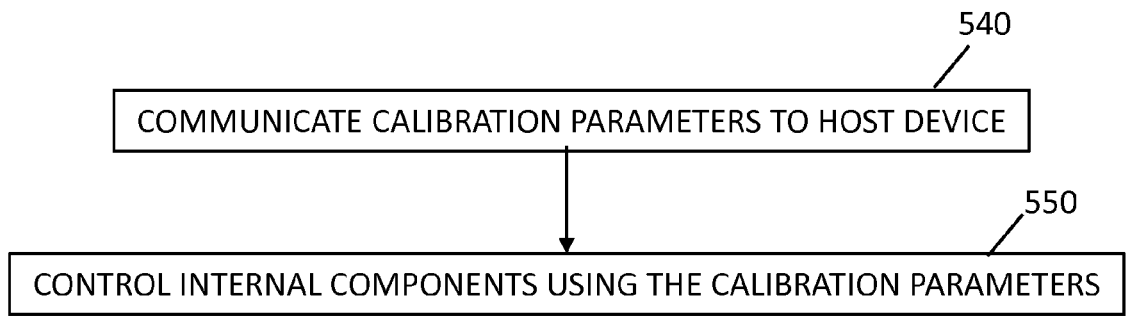
FIG. 13 illustrates a flow chart of an example method of using the calibration parameters of FIG. 11.

FIG. 13 illustrates a flow chart of an example of using the calibration parameters of FIG. 12 in an additive manufacturing process. The method includes communicating the calibration parameters to a host apparatus (block 540), for example when connecting the build module to the host apparatus. The method may further include controlling the internal components of the build module using the calibration parameters (550). The internal components may be controlled by a master controller of a host apparatus or a slave controller of the build module itself. In a further example, additional control is provided by a servomechanism.

Figure 14:
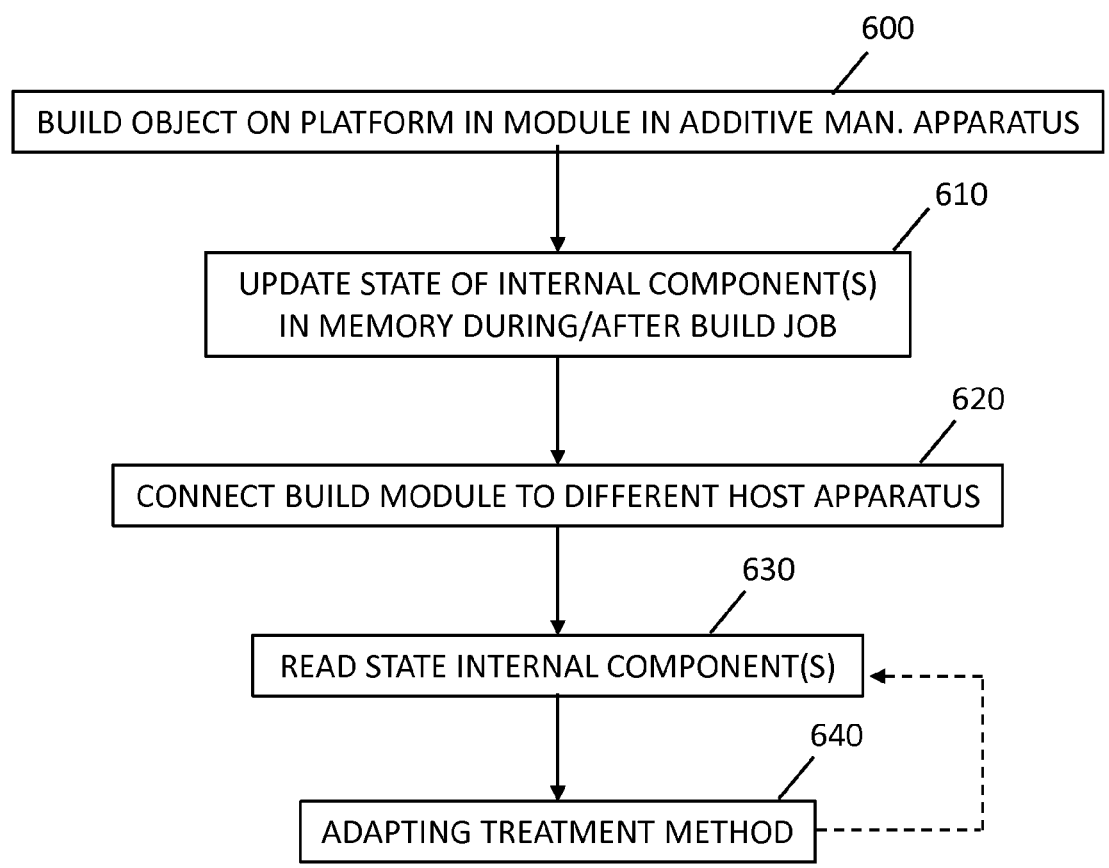
FIG. 14 illustrates a flow chart of an example method of using states of internal build module components.

FIG. 14 illustrates a flow chart of an example of a method of updating, in a memory, states of internal build module components, wherein the internal components may include at least one of a drive unit for a build platform, a build material transport unit for transporting build material to a build platform, pre-heaters to pre-heat portions of build material, and sensors such as temperature sensors and level sensors. The method includes building an object on a build platform in a build module in an additive manufacturing apparatus (block 600). The method includes updating a state of at least one internal component in a memory of the build module during and/or after completion of the build job (610). In one example such state may be a height position of a build platform, based on a read-out of an encoder position. The method further includes connecting the build module to a different host apparatus (block 620). The method includes reading and using the read internal component state before starting a respective process (630). For example, certain states may include a height of the build platform and a height of a top surface of build material and a printed object. The method includes adapting a treatment method based on the read state (640). For example, a host apparatus may adapt cleaning and/or cooling settings based on the read height.

The example method of FIG. 14 may apply to several additive manufacturing processes. For example, after completing a build job and connecting the module to another host apparatus it is read that a temperature in the module is high. Hence, the other host apparatus may set a cooling time based on the read temperature. For example, after completing a build job and connecting the module to another host apparatus it is read that a platform is positioned at a certain height. Hence, the host apparatus may heighten the platform to allow filling the build module with build material. For example, after completing a build job and connecting the module to another host apparatus the level sensor indicates a certain height level of the build material and the object on the platform. Hence, the host apparatus may adapt clean and/or cool settings to the read height and/or volume.

Figure 15:
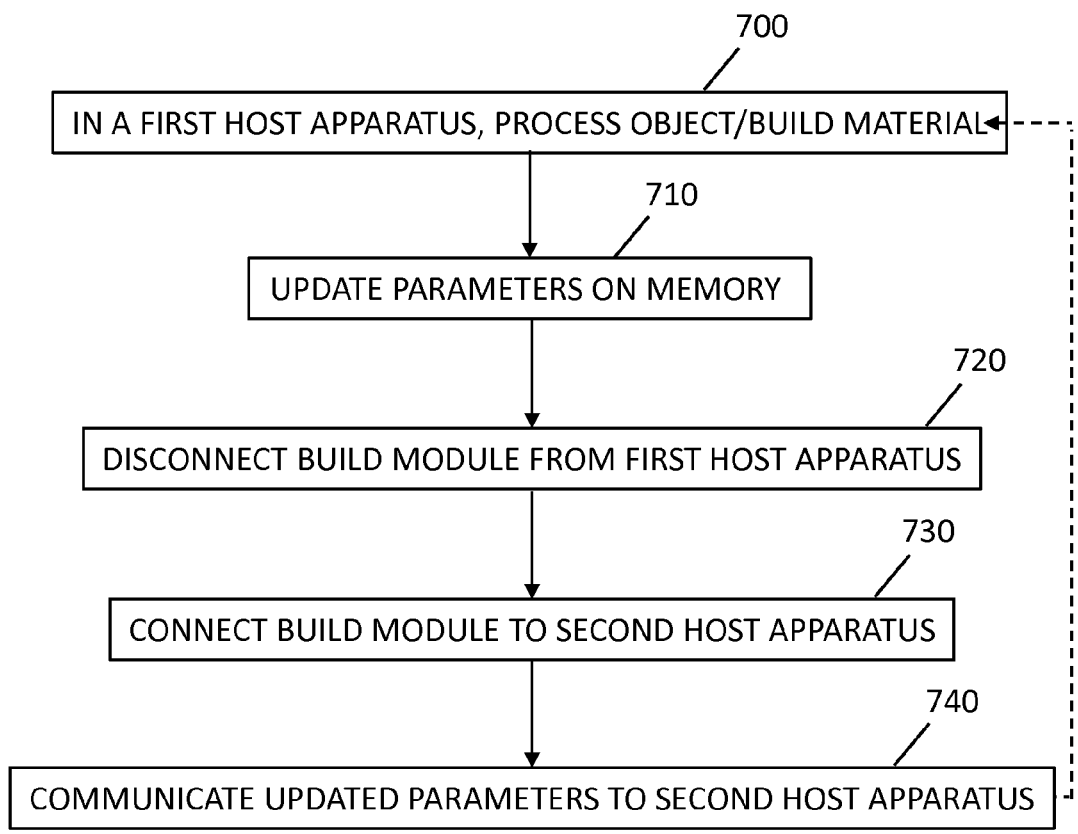
FIG. 15 illustrates a flow chart of an example method of communicating parameters between host apparatuses in additive manufacturing.

FIG. 15 illustrates a flow chart of an example method of communicating parameters between host apparatuses in additive manufacturing. The method includes, in a first host apparatus, processing an object and/or build material (block 700). Processing may include any form of treatment including printing or post-processing. The method further includes updating build parameters on the memory (block 710). Also states of internal components may be updated. The method further includes disconnecting the build module from the first host apparatus (block 720). The method further includes connecting the build module to a second host apparatus (730). The method further includes communicating the updated parameters to the second host apparatus (block 740). Here, the second host apparatus may use these updated parameters to adapt its respective treatment process to the state of the build module, that is, the state of the build material(s) and the internal components. A similar method would apply when disconnecting the build module from a host apparatus and after some waiting time connecting again to the same host apparatus.

Figure 16:
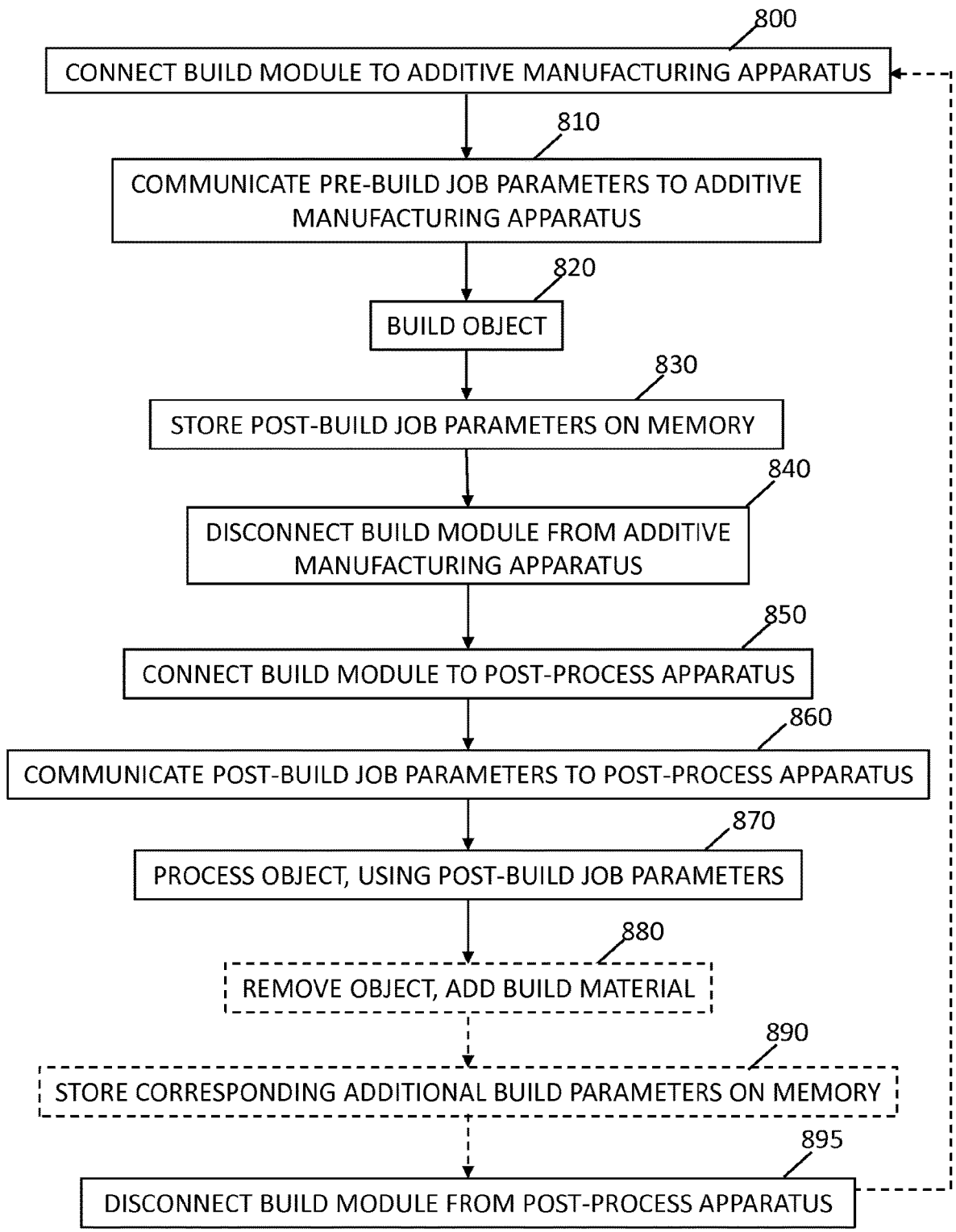
FIG. 16 illustrates a flow chart of another example method of communicating parameters between host apparatuses in additive manufacturing.

FIG. 16 illustrates a flow chart of another example method of communicating parameters between host apparatuses in additive manufacturing. The method may include connecting a build module to an additive manufacturing apparatus (block 800). The method may include communicating pre-build job parameters to the additive manufacturing apparatus (block 810). The method may include building an object through additive manufacturing (block 820), using the pre-build job parameters. The method may include, after completing the job, storing post-build job parameters on the memory (block 830). In one example post-build job build parameters include parameters related to the printed object. The post-build job parameters may be uploaded to the build module memory by the additive manufacturing apparatus. The method may further include disconnecting the build module from the additive manufacturing apparatus (block 840). The method may further include connecting the build module to a post-process apparatus (block 850). The method may further include communicating the post-build job parameters to the post-process apparatus (block 860). In an example, additional updated post-build job parameters or internal component states may be communicated at connection such as an updated temperature of the build material and object. The method may further include processing the object (e.g. sieving, cooling, cleaning, coating, etc.) based on the read post-build job parameters (block 870). In an example, the same or a different host apparatus may facilitate refilling the build module. Hence, the method may further include removing the manufactured object from the built platform, and adding build material to the storage compartment for a subsequent build job (block 880). Here, the volume of build material that is added may be based on the post-build job parameters as well, for example on a volume of the printed object. The method may further include updating the build parameters by storing build parameters corresponding to the added build material on the memory of the build module (block 890). The method may further include disconnecting the build module from the post-process apparatus (block 895). In a further example, the filled build module is again connected to the additive manufacturing apparatus to start a new build job wherein the updated (pre-build job) build parameters may be communicated.

Figure 17:
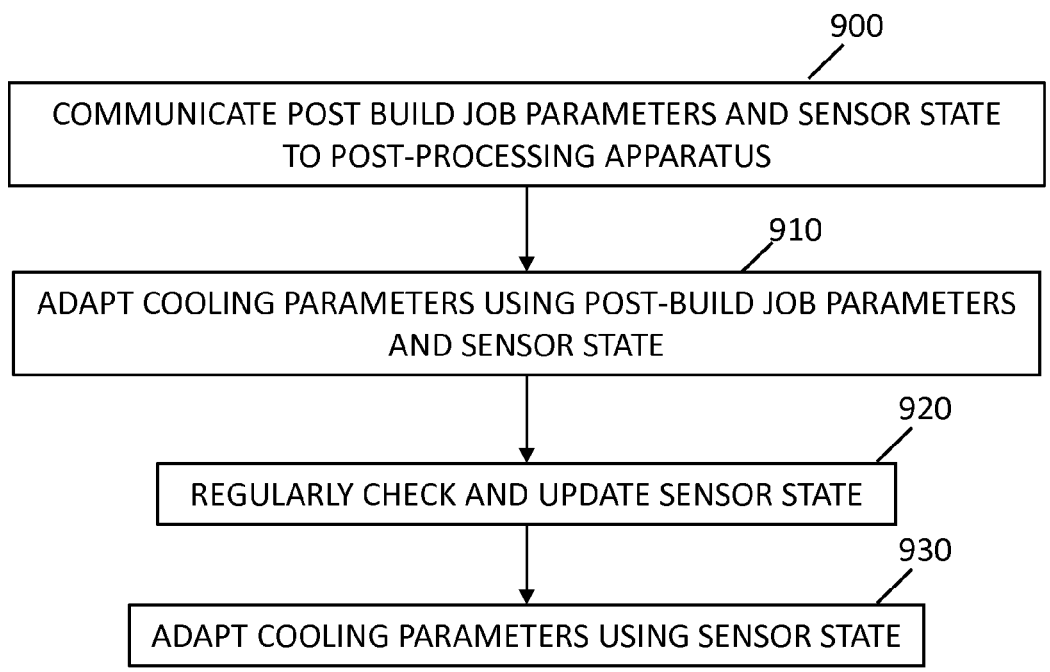
FIG. 17 illustrates a flow chart of an example of a post-build job process.

FIG. 17 illustrates an example of a post-build job process. The process includes communicating post-build job parameters and a temperature sensor state from a build module memory to a post-processing apparatus (block 900). In one example, the sensor is read directly by a master controller of the post-processing apparatus. For example the communication may include information relating to a volume of the object and a temperature in the build compartment. The process includes the post-processing apparatus adapting its cooling parameters based on the post-build job parameters and temperature sensor state (block 910). The process further includes regularly checking sensor states and updating these states in the memory of the module (block 920). The process further includes adapting cooling parameters of the post-process apparatus based on the sensor state. Storing the sensor state in the memory allows for a fast reading of internal component states by the host apparatus when re-connecting the build module to the host apparatus.

In certain examples of this disclosure, an intelligent build module is described that includes a build platform and a build material storage, can connect to multiple host apparatuses, and at any time communicate an updated state of its contents, including build materials and internal components, so that the respective host apparatus can optimize its process based on the updated state.

While this disclosure refers mostly to "an object", in fact, multiple objects or object parts may be manufactured in a single build job in the context of this disclosure. In fact, an object may be interpreted as a plurality of objects that are physically detached from each other. While this disclosure refers mostly to a memory of the build module, the build module may include multiple memories, for example extra memories that have back-up functions.

What is claimed is:

1. A removable build module to be connected to and removed from a 3-dimensional (3D) printer host apparatus, comprising:
    a storage compartment to store a build material,
    a build platform on which a 3D object is to be built by the 3D printer host apparatus using the build material stored in the storage compartment,
    a drive unit that moves the build platform when the 3D object is being built on the build platform, a memory including first data fields that store pre-build job parameters and second data fields that store post-build job parameters, wherein the pre-build job parameters are data related to the build material in the storage compartment to be used by the 3D printer host apparatus to build the 3D object, wherein the post-build job parameters are data related to the 3D object after the 3D object has been built, and wherein the memory of the removable build module is separate from a memory of the 3D printer host apparatus, an interface circuit including a communication bus to connect to an interconnect circuit of the 3D printer host apparatus to provide the pre-build job parameters to the 3D printer host apparatus when the removable build module is connected to the 3D printer host apparatus, and a mechanical fastener to fasten the removable build module to the 3D printer host apparatus in a fixed position when the removable build module is connected to the 3D printer host apparatus.

2. The removable build module of claim 1, comprising a build material transport unit that transports the build material from the storage compartment to the build platform when the 3D object is being built on the build platform.

3. The removable build module of claim 1, wherein, when the removable build module is removed from the 3D printer host apparatus and is connected to another 3D printer host apparatus, the interface circuit of the removable build module connects to the other 3D printer host apparatus, and communicates the post-build job parameters stored in the second data fields of the memory of the removable build module to the other 3D printer host apparatus.

4. The removable build module of claim 1, wherein the post-build job parameters include information related to a weight, a volume, or a heat conductivity of the 3D object after the 3D object has been built.

5. The removable build module of claim 1, wherein the storage compartment is further to store additional build materials, and the memory of the removable build module further includes additional data fields to store additional pre-build job parameters corresponding to the additional build materials in the storage compartment.

6. The removable build module of claim 1, wherein the pre-build job parameters stored in the first data fields of the memory of the removable build module include a melt temperature, a crystallization temperature and a radiation absorptivity factor of the build material.

7. The removable build module of claim 1, comprising a temperature sensor to sense a temperature of the build material when the build material is deposited on the build platform from the storage compartment.

8. The removable build module of claim 7, comprising a build material level sensor to sense a top surface level of the build material when the build material is deposited on the build platform.

9. The removable build module of claim 1, comprising heaters to heat the build material in the storage compartment before the build material is deposited on the build platform.

10. The removable build module of claim 1, wherein the memory of the removable build module further includes: additional data fields that store a state of the drive unit and a state of the build platform.

11. The removable build module of claim 10, further comprising: a transport unit, a build material sensor, and heaters, wherein the additional data fields further store a state of the transport unit, a state of the build material sensor and a state of the heaters.

12. The removable build module of claim 11, comprising a controller that controls the drive unit, the transport unit, the build material sensor and the heaters.

13. The removable build module of claim 1, wherein the memory of the removable build module further stores a count value of accumulated build job cycles of the removable build module.

14. The removable build module of claim 1, wherein the mechanical fastener latches the removable build module to the 3D printer host apparatus so that the build platform is held in position with the 3D printer host apparatus and the connection between the interface circuit of the removable build module and the interconnect circuit of the 3D printer host apparatus is maintained.

15. A removable build module to removably connect to a 3-dimensional (3D) printer host apparatus, comprising:
internal components including:
a build platform on which a 3D object is to be built by the 3D printer host apparatus;
a drive unit that moves the build platform when the 3D object is being built on the build platform; and
a memory, separate from a memory of the 3D printer host apparatus, including:
a first memory module that stores pre-build job parameters to be used by the 3D printer host apparatus to build the 3D object, wherein the pre-build job parameters are data related to a build material that is used to build the 3D object, and
a second memory module that stores post-build job parameters, wherein the post-build job parameters are data related to the 3D object after the 3D object has been built;
a mechanical fastener to latch and fasten the removable build module to the 3D printer host apparatus in a fixed position when the removable build module is connected to the 3D printer host apparatus; and
an interface circuit including a communication bus to connect to the 3D printer host apparatus and provide the pre-build job parameters to the 3D printer host apparatus when the removable build module is connected to the 3D printer host apparatus.

16. The removable build module of claim 15, comprising a temperature sensor to sense a temperature of the build material when the build material is deposited on the build platform.

17. The removable build module of claim 16, comprising a build material level sensor that senses a top surface level of the build material when the build material is deposited on the build platform.

18. The removable build module of claim 15, comprising a heater that pre-heats the build material before the build material is deposited on the build platform.

19. The removable build module of claim 15, comprising: wheels attached to a bottom of the removable build module.

20. The removable build module of claim 1, comprising: wheels attached to a bottom of the removable build module.

* * * * *